(12) United States Patent
Cutajar

(10) Patent No.: US 8,903,075 B2
(45) Date of Patent: Dec. 2, 2014

(54) CUSTOMER/SUBSCRIBER/USER IDENTIFICATION VIA UTILIZED SERVICE NODE/POINT

(75) Inventor: Louis Joseph Cutajar, Woodstock, GA (US)

(73) Assignee: Cox Communications, Inc., Atlanta, GA (US)

( * ) Notice: Subject to any disclaimer, the term of this patent is extended or adjusted under 35 U.S.C. 154(b) by 229 days.

(21) Appl. No.: 13/048,351

(22) Filed: Mar. 15, 2011

(65) Prior Publication Data

US 2012/0195421 A1 Aug. 2, 2012

Related U.S. Application Data

(60) Provisional application No. 61/437,929, filed on Jan. 31, 2011.

(51) Int. Cl.
*H04M 3/00* (2006.01)
*H04M 5/00* (2006.01)

(52) U.S. Cl.
USPC ............ 379/265.02; 379/265.05; 379/265.11; 379/265.13

(58) Field of Classification Search
USPC ............ 379/265.02, 265.05, 265.01, 265.11, 379/265.13, 242, 207.15, 201.01
See application file for complete search history.

(56) References Cited

U.S. PATENT DOCUMENTS

| 6,480,599 B1 * | 11/2002 | Ainslie et al. ............ 379/265.02 |
| 7,899,177 B1 * | 3/2011 | Bruening et al. ......... 379/265.05 |
| 2009/0037732 A1 * | 2/2009 | Boccon-Gibod et al. ..... 713/168 |

* cited by examiner

*Primary Examiner* — Thjuan K Addy
(74) *Attorney, Agent, or Firm* — Merchant & Gould

(57) ABSTRACT

Management of call center call routing is provided. Service calls directed to a call center may be routed for processing based on an identification of a service node of a caller. The service node may be identified by parsing a database for a calling customer's node ID, determining a format of the node ID, and converting the node ID into a numeric value that represents the node ID associated with the calling customer. If the numeric node ID value meets a predetermined criterion, the service call may be processed according to a priority call routing instruction.

20 Claims, 8 Drawing Sheets

| Node ID* | Node ID Numeric Value** | Miscellaneous |
|---|---|---|
| Axxx | 1000 + xxx | |
| Bxxx | 2000 + xxx | |
| Cxxx | 3000 + xxx | |
| Dxxx | 4000 + xxx | |
| Exxx | 5000 + xxx | |
| Fxxx | 6000 + xxx | |
| Gxxx | 7000 + xxx | |
| Hxxx | 8000 + xxx | |
| Ixxx | 9000 + xxx | |
| Jxxx | 10000 + xxx | |
| Kxxx | 11000 + xxx | |
| Lxxx | 12000 + xxx | |
| Mxxx | 13000 + xxx | |
| Nxxx | 14000 + xxx | |
| Oxxx | 15000 + xxx | |
| Pxxx | 16000 + xxx | |
| Qxxx | 17000 + xxx | |
| Rxxx | 18000 + xxx | |
| Sxxx | 19000 + xxx | |
| Txxx | 20000 + xxx | |
| Uxxx | 21000 + xxx | |
| Vxxx | 22000 + xxx | |
| Wxxx | 23000 + xxx | |
| Xxxx | 24000 + xxx | |
| Yxxx | 25000 + xxx | |
| Zxxx | 26000 + xxx | |
| AAxxx | 27000 + xxx | |
| ... | ... | |
| ZZZxxx | 18278000 + xxx | |

CUSTOMER/SUBSCRIBER/USER IDENTIFICATION VIA UTILIZED SERVICE NODE/POINT

CROSS REFERENCE TO RELATED APPLICATIONS

The present application claims priority to U.S. Provisional Patent Application No. 61/437,929 filed Jan. 31, 2011, which is hereby incorporated by reference.

BACKGROUND

A provider of a service, for example, telephone services, CATV services, data services, and the like, often operates or utilizes one or more call centers to receive and process calls from customers/subscribers/users regarding service offerings and/or service problems/needs. Similarly, a provider of a particular good, for example, computers, may operate or utilize one or more call centers to allow customers to receive help with purchased items/systems. In many such cases, a provider of goods or services may operate an internal call center for handling service calls.

An example service provision, such as a cable television (CATV) service provision, may be provided to customers via a broadband network, such as a hybrid fiber-coaxial (HFC) network. The broadband network may extend from a service provider's headend to a hubsite to a node. There may a given number of nodes per customer base, and each node may be identified by a node identifier (node ID). A service provider database may contain various pieces of customer information, which may include a node ID of the node to which the customer is physically tethered.

There may be times when it may be useful to know a customer's location, for example, based on a given service node associated with the customer, when the customer makes a call to a service provider call center. For example, there may be times when a competitor of the service provider may target a certain neighborhood or area and offer new products, sale prices, etc. That is, the competitor may run a campaign in the service provider's area to try to compete. In such a scenario, it would be useful for the service provider to know if a customer is calling from a given location which may be known by the service provider as an area being targeted by a competitor. By knowing such information, the call center may be able to treat the customer differently if the provider so chooses.

As another example, if there is a services outage in a certain area, it may be advantageous for the call center to know if an incoming call is from a customer associated with a services node in the given outage area so that the call may be handled in a predetermined specified way.

It is with respect to these and other considerations that the present invention has been made.

SUMMARY

Embodiments of the present invention solve the above and other problems by providing identification and routing of service calls placed to a call center. According to aspects of the invention, service calls directed to a call center may be routed for processing as determined by the service provider based on an identification of a service node of a caller. The service node identification (ID) may be determined by performing a database dip for the caller, and returning a numeric value representative of the node ID for the calling customer.

Embodiments of the present invention provide for a call center to dynamically modify a routing of a call based on a calling customer's node ID. For example, embodiments of the present invention may be utilized to play a specified announcement upfront to calling customers who are identified as connected to a node experiencing an outage. As another example, calls may be routed to a specific call center representative or outsourcer if the caller is identified as associated with a specific node where competition may be entering or attempting to enter the service provider's services area.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

As briefly described above, embodiments of the present invention are directed to identifying a utilized service node in association with a calling customer, and determining a routing of a call based on the identified service node. A call directed to a call center may be routed for processing based on an identification of a service node of a caller. The service node may be identified by parsing a database for a calling customer's node ID, determining a format of the node ID, and converting the node ID into a numeric value that represents the node ID associated with the calling customer.

These embodiments may be combined, other embodiments may be utilized, and structural changes may be made without departing from the spirit or scope of the present invention.

Figure 1:
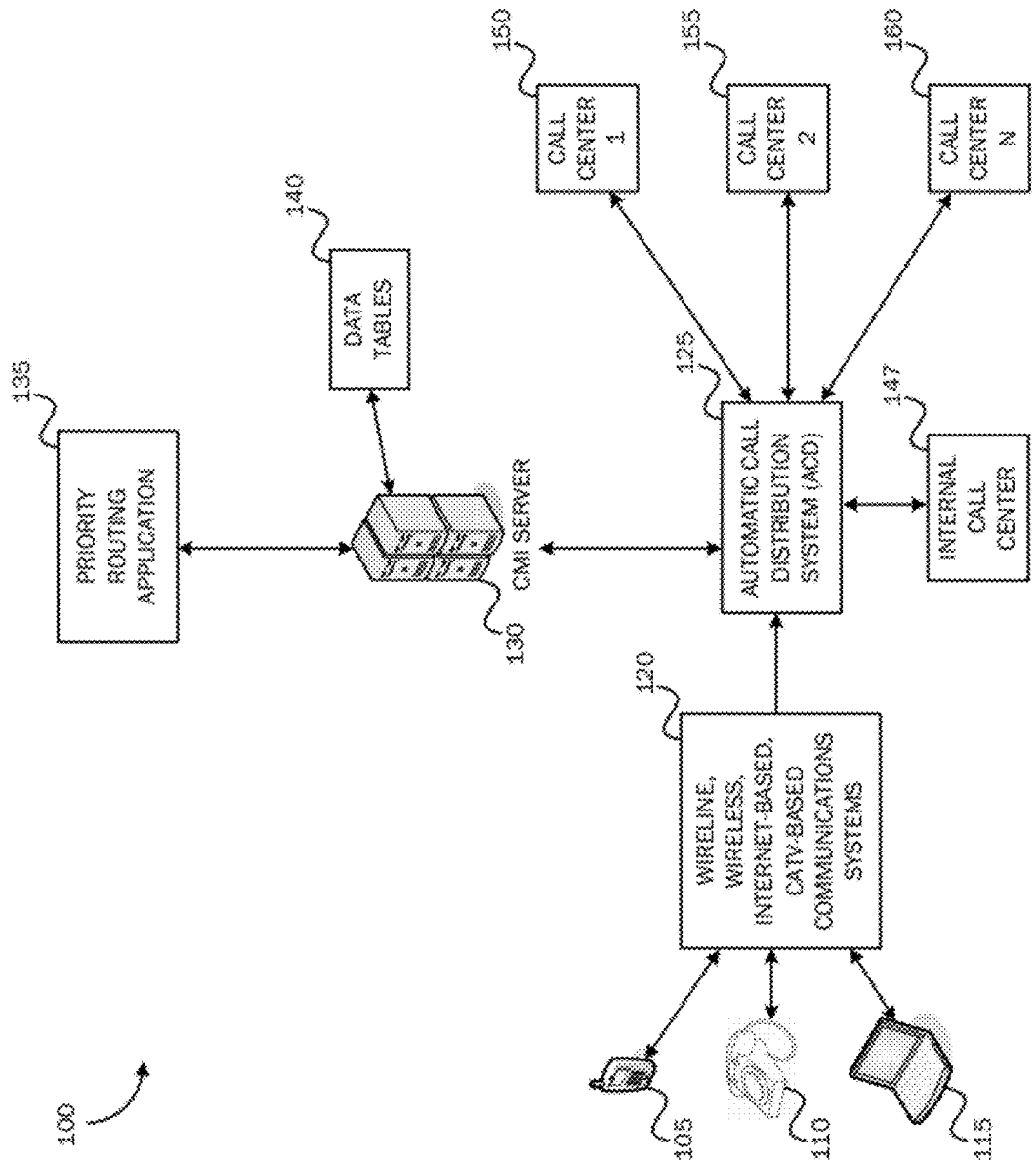
FIG. 1 is simplified block diagram illustrating an architecture that serves as an exemplary operating environment for the present invention.

FIG. 1 is a simplified block diagram illustrating a system architecture in which embodiments of the present invention may be practiced. As described herein, providers of goods and/or services often provide access by customers/subscribers to a call center for receiving information about goods or services including help information, use information, repair information, problem reporting, and the like. A provider of goods, for example, computers, electronics, software products, hardware products, etc., may similarly receive many calls per day for providing information associated with those goods.

In addition to receiving incoming calls related to use, repair, maintenance, and the like associated with particular goods and services, providers of goods and services may also receive incoming calls associated with business and transactional items, for example, billing, purchasing, delivery, and the like. Indeed, as should be appreciated, embodiments of the present invention may be applied to any line of business type for which an incoming call may be received.

Referring still to FIG. 1, a variety of communications means, for example, a hand held wireless communication device 105, a wire line telephone 110, or a computer 115 may be utilized by a user/purchaser/subscriber of goods or services to communicate over a wireless, wire line, Internet-based, cable television-based communication system, or any other available communications means 120 to an automatic call distribution system (ACD) 125 operated by the provider of the applicable goods or services. For example, the ACD 125 may be a communications receiving system at a business headquarters for receiving incoming service related calls.

As is appreciated by those skilled in the art, the ACD 125 may be a device or system used for distributing incoming calls to a group of terminals at an internal call center 147 operated by the receiving goods or services provider, or the ACD 125 may be utilized for distributing incoming calls to one or more terminals operated at alternate call centers 150, 155, 160. The ACD 125 may include hardware, software, switches, phone lines, and routing technology for routing incoming calls to one of the call centers 147, 150, 155, 160 according to one or more call routing procedures. According to embodiments of the present invention, call routing procedures may be based on an identified service node associated with a calling customer. Service node information, as well as other customer data, may be stored in a database 140. The service node information may be stored as a node ID, which may be in various formats. For example, a node ID may be numeric, alphanumeric, may begin with one character, may begin with two characters, may contain dashes, etc. The node ID may identify a physical node to which a customer may be physically tethered.

Referring still to FIG. 1, when a call is received at the ACD 125 for routing to one or more call centers, prior to routing the incoming call, a query may be passed to a computer media integration (CMI) server 130 for receiving a numeric value representing a node ID for a calling customer. According to embodiments, a priority routing application 135 may reside on the CMI server 130 for retrieving a node ID from a data table 140, converting the node ID into a numeric value, and returning the numeric value to the ACD 125. Using "if" statements in the ACD, a call routing procedure based on the returned numeric value may be determined for routing the incoming call. The node ID may be converted into a numeric value via applying a mathematical formula.

As should be appreciated, many different call routing procedures and arrangements may be created for various scenarios based on an identified service node associated with a calling customer. Embodiments of the present invention may allow a call center to dynamically modify routing of incoming calls based on a customer's node ID. Embodiments of the present invention may be used to play a specific announcement upfront to customers that are connected to a node experiencing an outage, to help retain customers by priority routing callers from a specific node where competition may be entering or attempting to enter a good/service provider's product offering or services provision area, route calls to a specific agent or outsourcer based on the node ID, and any other routing scenarios that may be accomplished via the ACD 125. As should be appreciated, for each incoming service call received at the ACD 125, a query is passed to the CMI server 130 for node ID data. Via the aforementioned functionality of the priority routing application 135, the node ID is normalized into a unique numeric value.

Figure 2A:
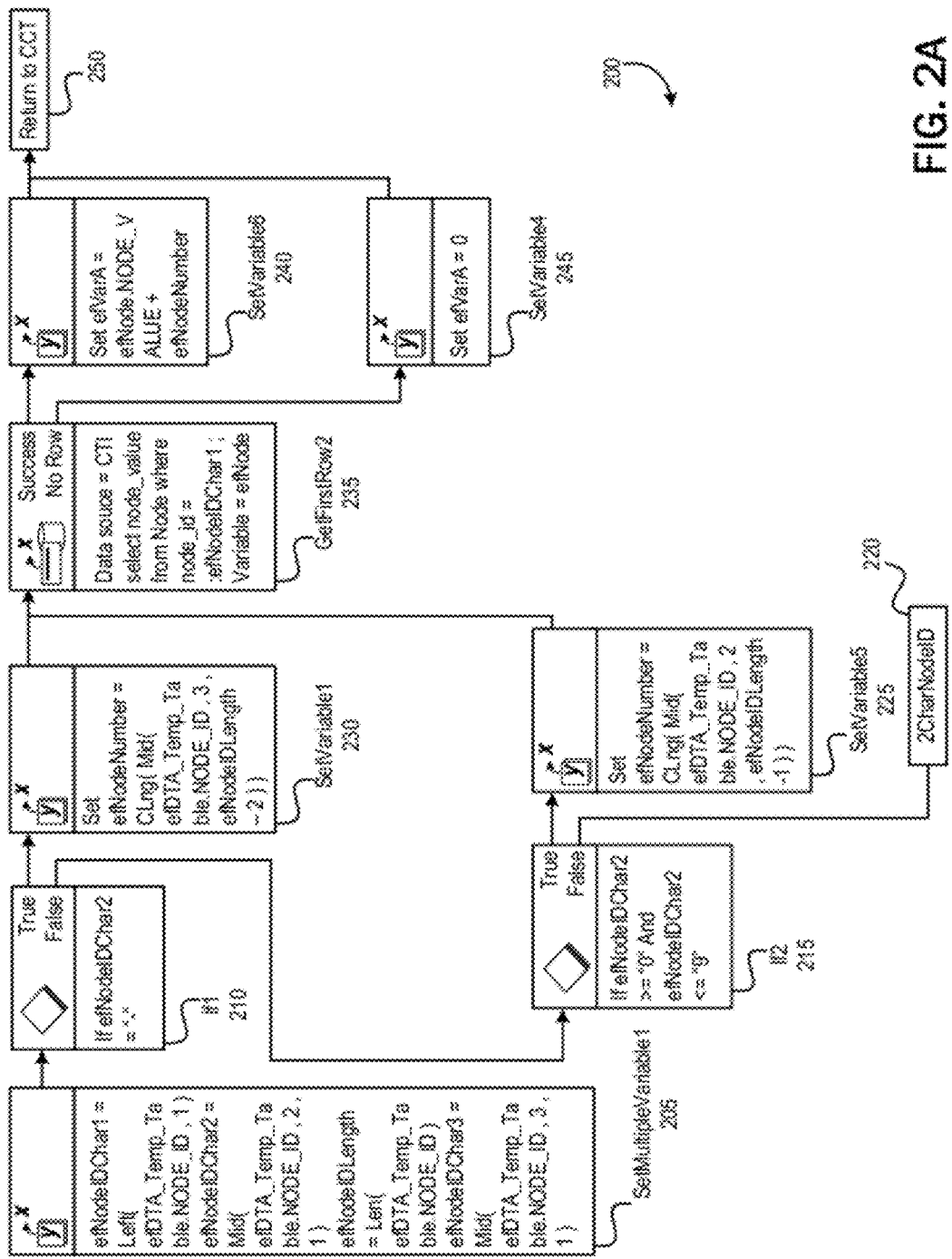
FIGS. 2A and 2B illustrate a workflow for determining a format of a node ID and converting it to a unique numeric value that represents the node ID.
Figure 2B:
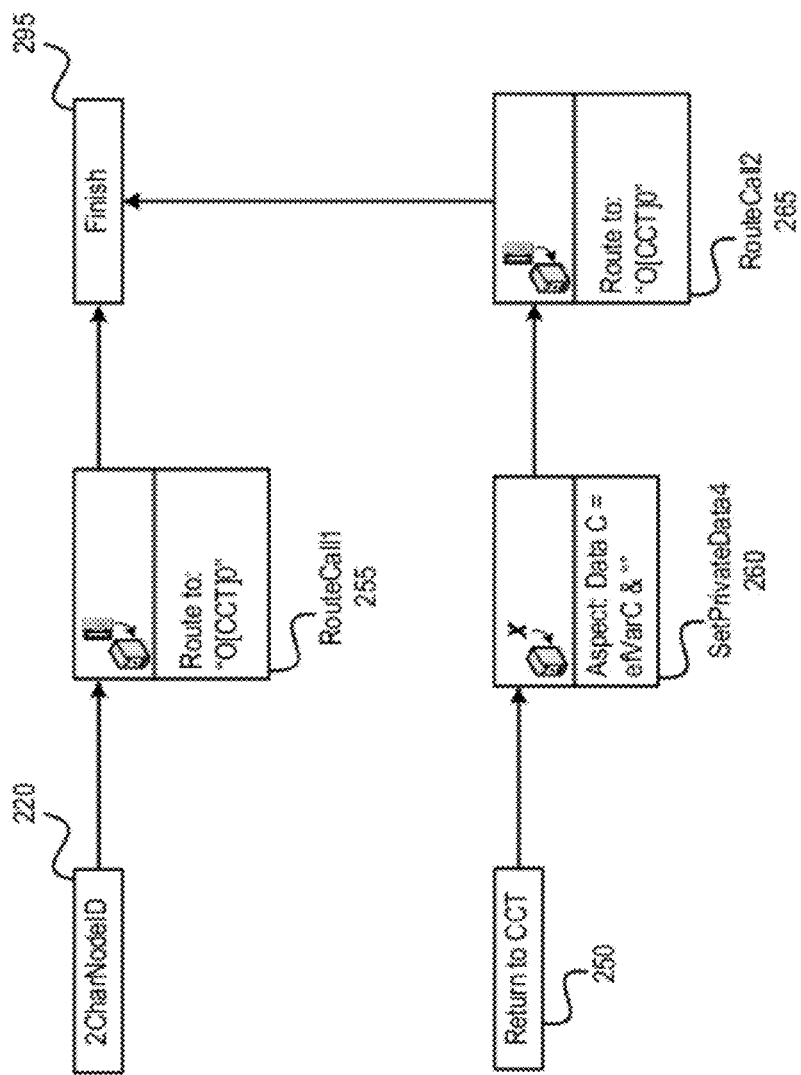

Referring now to FIG. 2A, a graphical display of a workflow for determining a format of a node ID and converting it to a unique numeric value that represents the node ID is shown. According to embodiments, a node ID may be stored in one of various formats. A node ID may be alphanumeric with a leading letter, may be alphanumeric with two leading letters, may contain dashes, may be numeric only, etc. As shown in FIG. 2A, the priority routing application 135 may determine the format of the node ID 205, 210. If the node ID contains characters, the characters may be set to a numeric value according to a node ID mapping table 205,225,230,235, 240,245. If a node ID contains a "-" between a character and a number (e.g., G-21) 210, the "-" may be ignored 230. If the node ID is of a format "XX9999" (i.e., has two leading alpha characters), the flow may be passed to a 2CharNodeID section 220 shown in FIG. 2B. The 2CharNodeID section 220 shown in FIG. 2B is responsible for mapping a numeric value to the node ID where the node ID has two leading alpha characters. According to embodiments, the conversion of the node ID into a numeric value is done to allow the ACD 125 to make routing decisions based on that value. The numeric node value is then sent in a return message 225,265 from the CMI server 130 to the ACD 125, where a decision is made whether to provide a priority routing procedure based on the numeric node value.

Figure 3:
FIG. 3 illustrates a node table which may be utilized for determining a routing of an incoming call to a call center.

As described above, the priority routing application 135 may apply a mathematical formula for converting a node ID into a numeric value. FIG. 3 illustrates a node table. The node table 300 in FIG. 3 may contain information that may be used to convert a node ID into a unique numeric identifier that can be utilized by an ACD 125 for determining if a call should receive priority routing. Node IDs may be stored in a database 140, and may be in various formats. As described above, one format of a node ID may be an alphanumeric ID beginning with a character, for example, A123. To convert the node ID into a numeric value, as shown in the node table 300 in FIG. 3, the "A" may be converted to a value of 1,000, and any following numeric digits may be added to the 1,000. For example, if the node ID is A123, the node ID numeric value would be 1,123. As another example, if the node ID is ZZZ999, the node ID numeric value would be 18,278,999. As should be appreciated, the conversion of the node ID into a numeric value is done to allow a routing decision to be made at the ACD 125 based on the node with which a calling customer is associated.

Figure 4A:
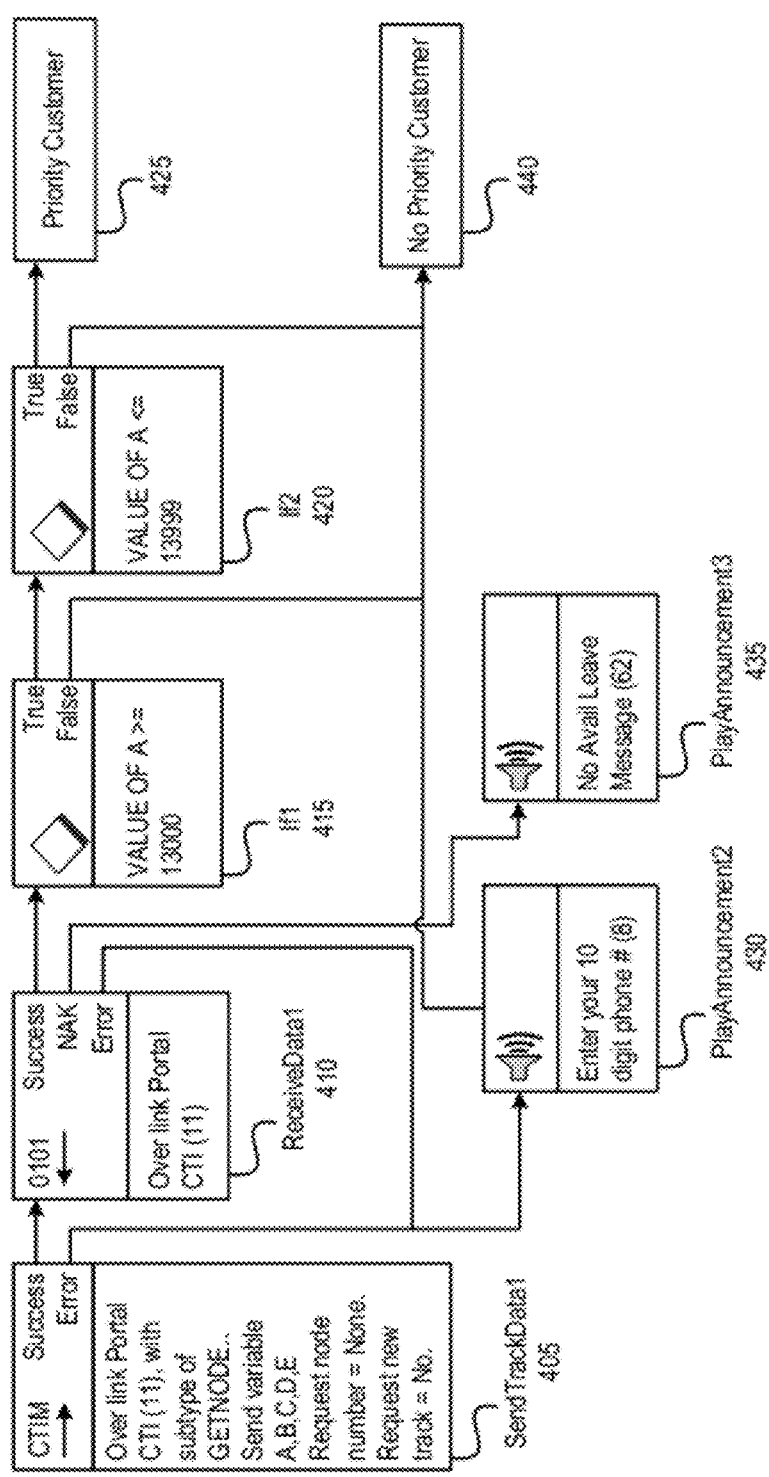
FIGS. 4A and 4B illustrate an example routing decision process.
Figure 4B:
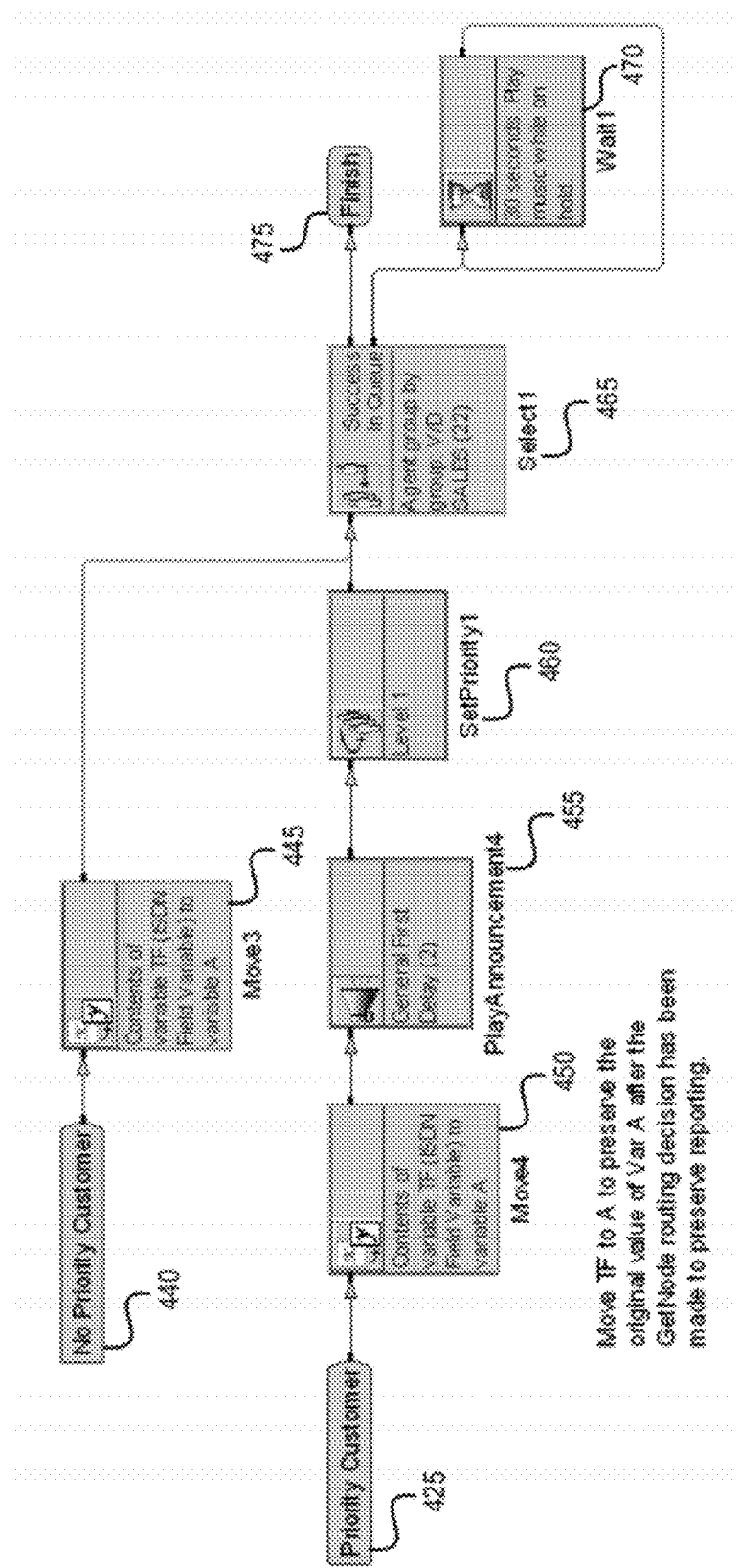

Referring now to FIGS. 4A and 4B, an example routing decision process is shown. In this example, a predetermination has been made that nodes M1-M99 are nodes of interest. That is, calls received associated with nodes M1-M99 should be treated as priority calls, and should receive a priority treatment. In this example, priority treatment is the call being routed to a sales agent.

As illustrated in FIG. 4A, a computer telephony interface message (CTIM) is sent at OPERATION 405 and received by the ACD 125 at OPERATION 410. The numeric value for a node ID is sent in variable A. At OPERATIONS 415 and 420, IF statements are used to discern if the numeric node ID value is within the range of a node of interest. As mentioned above, in this example, a node of interest is a node between M1 and M99. Using the node mapping table 300 in FIG. 3, node M1=13,001, and node M99=13,099. If the numeric node ID value is within the range of 13,001 and 13,099, a determination may be made that the calling customer is a priority customer 425. If the numeric node ID value is not within the range of 13,001 and 13,099, a determination may be made that the calling customer is not considered a priority customer 440.

According to embodiments, prior to invoking the priority routing application 135, contents of variable A may be temporarily stored in a variable TF (ISDN field variable), so that numeric node ID value information may stored in variable A for a priority routing decision. Referring now to FIG. 4B, after a determination has been made as to whether the calling customer is or is not a priority customer, at OPERATION 445 and 450, the contents that were temporarily stored in variable TF are moved back to variable A to preserve the original value of variable A to preserve reporting. At OPERATION 455, an announcement may be played, and at OPERATION 460, a priority level may be set. According to this example, the priority level is set at a priority level of one for the priority calling customer. At OPERATION 465, the call is routed to an agent. If there is a wait, at OPERATION 470, music or announcements may play while the call is on hold. The process ends at OPERATION 475.

Figure 5:
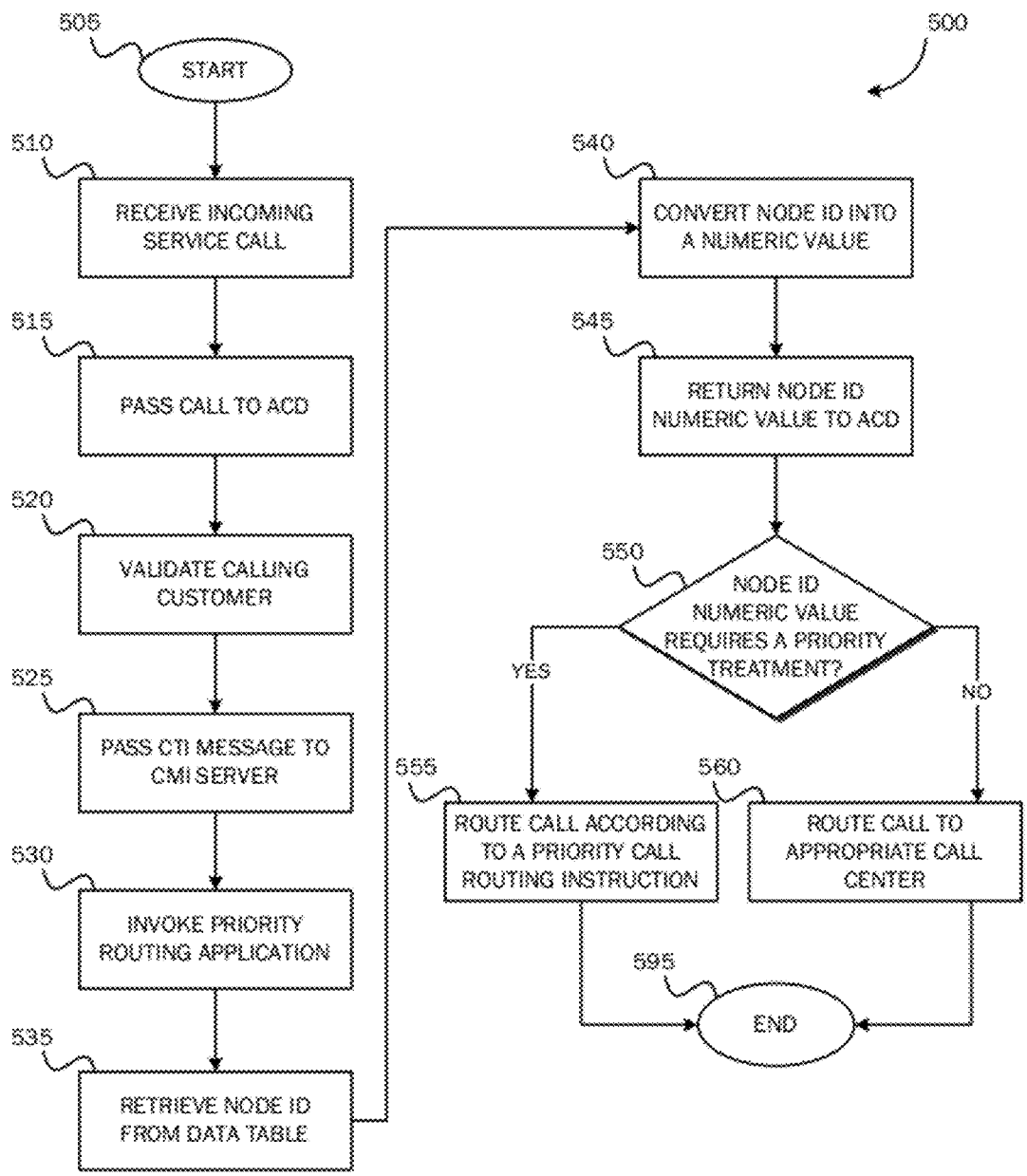
FIG. 5 illustrates a flow of a process for identifying a service node associated with a calling customer, and determining a routing of the call.

Having described an operating environment for embodiments of the present invention, a node table that may be used for converting a node ID into a numeric value, a node ID conversion flow and an example routing decision flow, FIG. 5 illustrates a flow of a process for identifying a node ID of a calling customer, converting the node ID into a numeric value, and determining a routing of a call based on the an identified service node associated with the numeric value according to embodiments of the present invention. The method 500 begins at start OPERATION 505, and proceeds to OPERATION 510 where an incoming service call is received from one or more communications sources 105, 110, 115, and is passed to the automatic call distribution system 125 at OPERATION 515.

At OPERATION 520, a determination is made as to whether a person making the service call is a valid customer. That is, information gathered about the incoming call (e.g., automatic number identification or ANI) at the ACD 125, may be mapped to data stored in a database to determine if the caller is a customer. Once a customer is validated, other information may be determined, such as whom the customer is, the customer's service address, etc. At OPERATION 525, after the caller is validated, a computer telephony interface message (CTIM) is sent from the ACD 125 to the CMI server 130 as illustrated in FIG. 1. As described above, the CTIM is passed from the ACD 125 to the CMI server 130 to invoke the priority routing application 135. The CTIM may include information such as, but not limited to, information telling the CMI server 130 which application to invoke, the customer's account number, and a unique identifier for the inbound call. At OPERATION 530, the priority routing application 135 initiates and the data in the CTIM is pulled into localized variables in the application.

At OPERATION 535, based on information obtained on the incoming call and from the database, the priority routing application 135 queries a data table 140 for a node ID. According to embodiments, the data table 140 may be an IVR (interactive voice response) table. A query may be sent to the IVR table based on the customer's account number and the unique identifier for the node ID. As described above, the node ID may be in one of various formats. In order for the ACD 125 to utilize the node ID information to determine whether the call should receive priority routing, the node ID needs to be normalized into a numeric format.

At OPERATION 540, the node ID is converted into a numeric value. The node ID may be parsed to determine its format. For example, the node ID may be alphanumeric with two leading characters (e.g., AB6720). As another example, the node ID may be alphanumeric with one leading character (e.g., A675). As another example, the node ID may be alphanumeric, with a character at the end (e.g., 675A). As another example, the node ID may be all numeric, or may contain dashes. Once a format is determined, as was described above, a mathematical formula may be applied to convert the node ID into a unique numeric number.

At OPERATION 545, the unique numeric number, (i.e., node ID numeric value) is returned to the ACD 125 via a CTIM (computer telephony interface message). At DECISION OPERATION 550, a determination is made as to whether the node ID numeric meets a criterion for a priority treatment. That is, certain nodes may be determined by a goods/service provider as being a node of interest, and may have a call routing procedure in place for handling a call from a customer associated with a node of interest. For example, if certain nodes are experiencing an outage, a call routing procedure may be: if node ID numeric value is greater than or equal to 2505000, and less than or equal to 2505999, then route the customer with a priority of 1. Priority of 1 may be associated with a call routing procedure of playing an announcement to the customer. If at DECISION OPERATION 550, a determination is made that the node ID numeric value requires a priority treatment, at OPERATION 555, the call may be routed according to a priority call routing instruction. As described above, a priority call routing instruction may include many possible routing instructions, such as routing a call to a specialized agent, playing an announcement, routing the call to a sales agent, etc. If at DECISION OPERATION 550, a determination is made that the node ID numeric value does not requires a priority treatment, at OPERATION 560, the call may be routed as a regular call. The method 500 ends at OPERATION 595.

Figure 6:
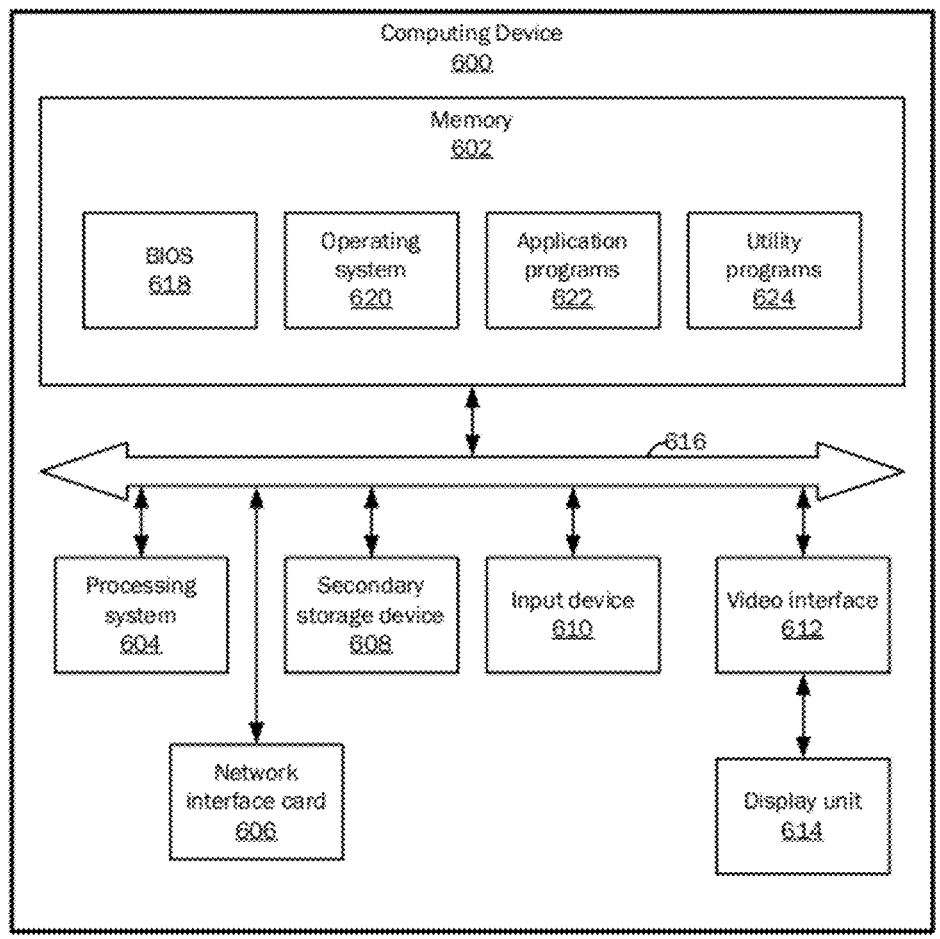
FIG. 6 is a block diagram illustrating a computing device with which embodiments of the present invention may be implemented.

FIG. 6 is a block diagram illustrating an example computing device 600 with which embodiments of the present invention may be implemented. As described above with respect to FIG. 1, embodiments of the invention may be implemented with or in association with one or more computing devices, such as the CMI server 130, the ACD 125, the devices 120 and any number of computing devices at or in association with the centers 150, 155, 160, 147.

Computing devices may be implemented in different ways according to different embodiments. For instance, in the example of FIG. 6, the computing device 600 comprises a memory 602, a processing system 604, a network interface 606, a secondary storage device 608, an input device 610, a video interface 612, a display unit 614, and a communication medium 616. In other embodiments, the computing device 600 is implemented using more or fewer hardware components (e.g., a video interface, a display unit, or an input device).

The memory 602 includes one or more computer-readable storage media capable of storing data and/or computer-executable instructions. In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more Intel Core microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface card 606. In different embodiments, the network interface card 606 is implemented in different ways, such as an Ethernet interface, a token-ring network interface, a fiber optic network interface, a wireless network interface (e.g., WiFi, WiMax, etc.), or another type of network interface.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600.

The video interface 612 outputs video information to the display unit 614. In different embodiments, the video interface 612 is implemented in different ways. For example, the video interface 612 is a video expansion card. In another example, the video interface 612 is integrated into a motherboard of the computing device 600. In various embodiments, the display unit 614 can be a an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface card 606, the secondary storage device 608, the input device 610, and the video interface 612. In different embodiments, the communications medium 616 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs 622 that, when executed by the processing system 604, cause the computing device 600 to provide applications to users. The priority routing application 135, described above, is an example of an application program 622. The memory 602 also stores one or more utility programs 624 that, when executed by the processing system6, cause the computing device 600 to provide utilities to other software programs.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

I claim:

1. A method of managing service calls directed to a call center; comprising;
    receiving an incoming service call;
    retrieving a node identification, the node identification identifying the node through which one or more customers are tethered;
    converting the node identification into a node identification numeric value;
    returning the node identification numeric value to a call distribution system;
    determining if the incoming service call should receive a priority treatment, wherein the priority treatment is received when the node identification numeric value is within a range associated with a plurality of nodes of interest; and
    if the incoming service call should receive priority treatment, routing the incoming service call according to a priority call routing instruction.

2. The method of claim 1, wherein prior to retrieving a node identification, passing the incoming service call to an automatic call distribution system, and obtaining identification information associated with the incoming call.

3. The method of claim 2, further comprising passing a computer telephony interface message from the automatic call distribution system to a computer media integration server, and at the computer media integration server, invoking a priority routing application for determining if the incoming service call should receive priority treatment.

4. The method of claim 1, prior to retrieving a node identification, determining whether the incoming service call should be considered for receiving a priority treatment.

5. The method of claim 4, wherein determining whether the incoming service call should be considered for receiving a priority treatment includes querying a database to determine if the incoming service call is associated with a valid customer.

6. The method of claim 1, wherein retrieving a node identification includes querying a database table for information associated with a utilized service node associated with the incoming service call.

7. The method of claim 1, wherein converting the node identification into a node identification numeric value includes determining a format of the node identification, and using a mathematical formula to convert the node identification into a numeric value.

8. The method of claim 1, wherein determining if the incoming service call should receive a priority treatment includes determining if the node identification numeric value meets a criterion for routing the incoming service call according to a priority call routing instruction.

9. The method of claim 1, wherein receiving an incoming service call includes receiving the incoming service call at an automatic call distribution system.

10. A system for managing service calls directed to a call center, comprising:
    an automatic call distribution system operative
        to receive an incoming service call;
        to gather data on the incoming service call for determining a validity of a customer;
        to query a priority routing application for a node identification numeric value; the priority routing application operative
        to retrieve a node identification from a database table, the node identification identifying the node through which one or more customers are tethered;
        to convert the node identification into a node identification numeric value;
        to pass the node identification numeric value to the automatic call distribution system for processing; and
    the automatic call distribution system being further operative
        to determine whether the incoming service call should receive a priority treatment, wherein the priority treatment is received when the node identification numeric value is within a range associated with a plurality of nodes of interest; and
        if the incoming service call should receive a priority treatment, to route the incoming service call according to a priority call routing instruction.

11. The system of claim 10, the automatic call distribution system being further operative to pass a computer telephony interface message from the automatic call distribution system to a computer media integration server, and
    the computer media integration server being operative to invoke the priority routing application for determining if the incoming service call should receive priority treatment.

12. The system of claim 11, the automatic call distribution system being further operative to convert the node identification into a node identification numeric value including determining a format of the node identification, and using a mathematical formula to convert the node identification into a numeric value.

13. The system of claim 12, the automatic call distribution system being further operative to determine if the node identification numeric value meets a criterion for routing the incoming service call according to a priority call routing instruction.

14. A method for managing service calls directed to a call center, comprising:
    receiving an incoming service call;
    gathering data on the incoming service call for determining a validity of a customer;
    querying a priority routing application for a node identification numeric value;
    retrieving a node identification, the node identification identifying the node through which one or more customers are tethered;
    converting the node identification into a node identification numeric value;
    passing the node identification numeric value to the automatic call distribution system for processing;
    determining whether the incoming service call should receive a priority treatment, wherein the priority treatment is received when the node identification numeric value is within a range associated with a plurality of nodes of interest; and
    if the incoming service call should receive a priority treatment, routing the incoming service call according to a priority call routing instruction.

15. The method of claim 14, wherein prior to retrieving a node identification, passing the incoming service call to an automatic call distribution system, and obtaining identification information associated with the incoming call.

16. The method of claim 15, further comprising passing a computer telephony interface message from the automatic call distribution system to a computer media integration server, and at the computer media integration server, invoking a priority routing application for determining if the incoming service call should receive priority treatment.

17. The method of claim 14, prior to retrieving a node identification, determining whether the incoming service call should be considered for receiving a priority treatment.

18. The method of claim 17, wherein determining whether the incoming service call should be considered for receiving a priority treatment includes querying a database to determine if the incoming service call is associated with a valid customer.

19. The method of claim 14, wherein retrieving a node identification includes querying a database table for information associated with a utilized service node associated with the incoming service call.

20. The method of claim 14, wherein converting the node identification into a node identification numeric value includes determining a format of the node identification, and using a mathematical formula to convert the node identification into a numeric value.

* * * * *